Patented Apr. 16, 1935

1,997,967

UNITED STATES PATENT OFFICE 1,997,967

METHOD FOR THE PRODUCTION OF STYROL FROM ETHYL BENZOL

Willis A. Gibbons, Great Neck, and Omar H. Smith, New York, N. Y., assignors, by mesne assignments, to United States Rubber Company, New York, N. Y., a corporation of New Jersey No Drawing. Application October 4, 1927, Serial No. 224,020

5 Claims. (Cl. 260—168)

Ethyl benzol has been subjected to pyrogenic dehydrogenation at temperatures in the vicinity of 500–700° C. It has also been proposed to carry out such dehydrogenation in the presence of inert gases such as nitrogen and carbon dioxide. The reaction which takes place causes the ethyl benzol to lose hydrogen and thereby to produce styrol. The reaction, however, is reversible to a certain extent, depending upon the temperature, the concentration of styrol in the reaction products, and upon the presence of catalysts or catalytic material such as those which might constitute the reaction furnace. There is in this reaction, whether it be carried out with ethyl benzol alone or in the presence of inert gases, a tendency for the hydrogen to recombine at least in part with the styrol to form ethyl benzol. The result of this is of course to reduce the yield of styrol. Furthermore, other hydrocarbons are formed during the dehydrogenation process and some of these tend to combine with the styrol.

According to the present invention, the pyrogenic dehydrogenation of ethyl benzol is carried out in the presence of compounds which disturb the equilibrium of the reaction in such a manner as to increase the yield of styrol and to prevent or to minimize any tendency of the hydrogen or other hydrocarbons to recombine with the styrol. The present invention offers therefore a means of increasing the yield of styrol so obtained and at the same time decreases subsequent manufacturing operations in that it permits the recovery of a more concentrated styrol solution which can be polymerized with greater ease than a more dilute solution. Hence the present invention furnishes a process whereby both productivity and efficiency are increased.

The objects of the invention are therefore to provide a method for increasing the yield of styrol obtained by the pyrogenic dehydrogenation of ethyl benzol, to increase the concentration of styrol in the reaction products thus obtained, to carry out the dehydrogenation of ethyl benzol in the presence of substances which favorably influence the reaction and minimize the reversibility of said reaction, and in short to increase both productivity and efficiency of the pyrogenic dehydrogenation of ethyl benzol to form styrol. Another object is to dehydrogenate ethyl benzol by treating it in the presence of a properly constituted dehydrogenating mixture or compound.

A dehydrogenating compound may be described as a compound which reacts with the hydrogen released during a cracking operation, thus reducing the quantity of free hydrogen in the cracking tube, and which may also reduce the partial pressure of the ethyl benzol. In other words a dehydrogenating compound favorably influences the process by chemical or by both chemical and physical means. A properly constituted dehydrogenating mixture is defined as a mixture which is capable of combining with free hydrogen in the cracking furnace, at the same time furnishing a considerable quantity of gas which reduces the partial pressure of the ethyl benzol. An inert compound or substance exerts no chemical effect whatever, and any benefit derived from dehydrogenating in the presence of an inert gas must be ascribed purely to the physical effect of reducing the partial pressure of the ethyl benzol. An inert gas may be used to advantage with a dehydrogenating compound which does not generate enough gas to lower the partial pressure of the ethyl benzol to a sufficient degree to secure maximum efficiency in the reaction. The use of an inert gas with a properly constituted dehydrogenating mixture offers no benefit, as the mixture already furnishes sufficient gas to lower the partial pressure in the tube. The term "productivity" used herein designates the percentage relationship between the styrol produced and the ethyl benzol passed through the cracking furnace. The term "efficiency" designates the percentage relationship between the styrol produced and the ethyl benzol consumed during the dehydrogenation. (Ethyl benzol consumed is the difference between the ethyl benzol passed through the tube and the ethyl benzol recovered). The productivity, efficiency and concentration of styrol in the steam distillate are all of importance for the best results with the process. Inert gases exert a favorable influence on efficiency but have only a moderate effect on productivity and concentration. On the other hand the dehydrogenating compounds which react chemically readily give high concentrations of styrol. Dehydrogenating mixtures exert an extremely favorable influence upon all three factors.

With a particular embodiment in mind but without intention to place limitations upon the scope of the invention beyond what may be required by the prior art, the invention briefly stated consists in subjecting ethyl benzol or similar hydrocarbons to pyrogenic dehydrogenation in the presence of substances which disturb the equilibrium of the reaction by chemically combining at least in part with the reaction products. The invention also includes carrying out the pyrogenic dehydrogenation of ethyl benzol and like compounds in the presence of substances which are substantially inert towards styrol, but combine with the hydrogen released by the reaction and at the same time reduce the concentration of other reaction by-products. The invention may be further characterized as a process for the pyrogenic dehydrogenation of ethyl benzol into styrol in the presence of a properly constituted dehydrogenating mixture which combines chemically with certain of the reaction products and reduces the partial pressure on the ethyl benzol thus increasing the productivity and efficiency of the reaction and increasing the yield of styrol obtainable therefrom.

The deyhdrogenation may be carried out in a tube furnace, using an iron, a chromel, or other tube heated electrically or in any other suitable way. Other accessory apparatus includes a container for the ethyl benzol, temperature measuring device, the usual flow meters, pressure recording instruments, condensers, receivers etc. No especial type of apparatus is required, but the customary cracking furnaces as employed in such reactions serve quite well. In the following illustrations an electrically heated tube furnace, either iron or chromel, three feet long and three-quarters inch inside diameter has been employed. The rate of flow of ethyl benzol into the furnace is approximately 100 grams per hr. for this size of tube. The temperature in the tube in the reaction zone is preferably 675–720° C. The amount of added material is based upon the amount of ethyl benzol supplied to the furnace.

It will be observed that carbon dioxide and nitrogen increase both productivity and efficiency, but are substantially without effect upon the percent of styrol in the steam distillate. These two gases function purely through their effect upon the partial pressure. Ammonia appears to influence the reaction in the same way as carbon dioxide and nitrogen, although there might be a slight chemical effect also. The same is true of ethyl alcohol and acetone. However, ethyl alcohol exerts an appreciably favorable effect upon the percentage of styrol in the distillate. Acetylene has a chemical effect in addition to the purely physical effect of reducing the partial pressure of the ethyl benzol in the reaction. It will be observed that the materials which have a chemical effect bring about an increase in the percentage of styrol in the steam distillate and this increase is of great importance in manufacturing. Carbon disulphide reacts chemically for the most part, forming hydrogen sulphide and perhaps other compounds. Carbon tetrachloride reacts chemically, forming hydrochloric acid gas. Chlorine reacts chemically, being reduced to hydrochloric acid gas. However, carbon formation may be encountered during the use of chlorine, and there is the further disadvantage that iron equipment cannot be used. This disadvantage, however, is overcome when tubes of materials inert to chlorine are employed. Chlorine also appears to form compounds which react catalytically with styrol to polymerize it prematurely and this polymer cannot be readily separated

| Added material | Reaction tube chromel or iron | Temp. | Per cent Styrol in steam dist. | Productivity | Efficiency |
|---|---|---|---|---|---|
| None | Chromel | 675 | 24.0 | 18.2 | 27.0 |
| Do | Iron | 700 | 32.3 | 22.4 | 30.0 |
| Do | Chromel | 725 | 26.3 | 14.9 | 18.0 |
| 2 carbon dioxide | do | 720 | 31.6 | 26.1 | 43.3 |
| 15 carbon dioxide | do | 720 | 27.9 | 22.1 | 38.2 |
| 3 nitrogen | do | 720 | 31.8 | 25.4 | 40.3 |
| 2 ammonia | do | 675 | 32.3 | 23.6 | 32.6 |
| 4 ethyl alcohol | do | 720 | 35.4 | 27.9 | 41.7 |
| 10 acetone | do | 720 | 32.8 | 25.4 | 37.7 |
| 5 acetylene | do | 720 | 33.4 | 24.6 | 34.3 |
| 5 carbon bisulphide | do | 700 | 33.6 | 26.9 | 41.8 |
| 10 carbon bisulphide | do | 720 | 33.0 | 26.5 | 41.3 |
| 10 carbon tetrachloride | Iron | 700 | 41.0 | 28.8 | 35.4 |
| 4 chlorine | Chromel | 675 | 34.5 | 25.8 | 35.2 |
| 8 chlorine | do | 700 | 38.0 | 28.6 | 39.0 |
| 13 chlorine | do | 700 | 41.6 | 34.8 | 51.7 |
| 7 ethylene | do | 700 | 39.0 | 26.6 | 32.3 |
| 7 ethylene chloride | do | 700 | 37.6 | 31.3 | 48.9 |
| 14 ethylene chloride | do | 700 | 44.0 | 30.7 | 38.5 |
| 1 sulphur | Iron | 700 | 34.0 | 24.2 | 36.0 |
| 2 sulphur | do | 700 | 34.8 | 27.9 | 43.1 |
| 3 sulphur | do | 700 | 42.1 | 31.6 | 41.6 |
| 6 sulphur | Chromel | 700 | 39.2 | 30.4 | 42.6 |
| 5 sulphur monochloride | do | 700 | 38.0 | 30.8 | 46.0 |
| 10 sulphur monochloride | do | 700 | 37.3 | 27.7 | 37.6 |
| 7 sulphur dioxide | Iron | 675 | 31.4 | 24.0 | 36.0 |
| 14 sulphur dioxide | do | 700 | 38.0 | 25.8 | 30.6 |
| 22 sulphur dioxide | Chromel | 700 | 29.6 | 28.4 | 47.4 |
| 7 actone+2.2 sulphur | Iron | 710 | 36.4 | 31.4 | 52.5 |
| Do | do | 720 | 39.3 | 31.5 | 45.7 |
| 5 carbon bisulphide+10 ethylene chloride | do | 700 | 41.8 | 32.4 | 43.2 |
| 5 ethylene+2 sulphur | Chromel | 700 | 45.4 | 35.0 | 45.3 |
| 2 sulphur+9 carbon dioxide | do | 720 | 41.0 | 31.4 | 42.3 |
| 2.5 sulphur+5 carbon bisulphide | do | 720 | 43.0 | 35.6 | 51.8 |
| 2.2 sulphur+10 tetrachloride | Iron | 700 | 45.2 | 33.1 | 41.0 |
| 2.5 sulphur+10 ethylene chloride | Chromel | 720 | 42.4 | 35.1 | 51.3 |
| 3 sulphur+10 ethylene chloride | do | 710 | 34.0 | 29.8 | 53.5 |
| 2.5 sulphur+9 carbon dioxide+10 ethylene chl | do | 720 | 42.4 | 32.8 | 44.2 |
| 2.25 sulphur+5 carbon bisulphide+5 carbon tetrachl | Iron | 700 | 46.2 | 37.9 | 52.4 |
| 2.25 sulphur+5 carbon bisulphide+5 ethylene chl | do | 700 | 41.5 | 34.8 | 52.7 |
| 2.25 sulphur+5 carbon bisulphide+7 ethylene chl | do | 700 | 48.0 | 36.6 | 44.8 |
| Do | do | 685 | 40.4 | 33.9 | 52.0 |
| 2.25 sulphur+5 carbon bisulphide+10 ethylene chl | do | 700 | 44.3 | 35.2 | 48.0 |
| .22 hydrogen | Chromel | 700 | 29.0 | 8.5 | 9.0 |

Referring to the above table, the values shown are comparative for the size of reaction tube used. The same general order of improvement, however, extends to manufacturing conditions, and the above values may therefore be used as a guide in manufacture.

from the impurities. Ethylene and ethylene chloride both react chemically, the latter also physically, forming hydrochloric acid and vinyl chloride, and this last mentioned product probably reacts with free hydrogen to form ethyl chloride. The action of sulphur is almost entirely chemical, it being reduced to hydrogen sulphide in the cracking tube. The optimum effect with sulphur alone apparently is gained with the use of 3 parts of sulphur, and the temperature of the ethyl benzol in the feed pipe should be kept about 45° C. It is preferable, however, to use sulphur in conjunction with other compounds which release a considerable quantity of gas. Sulphur monochloride reacts both chemically and physically, forming hydrogen sulphide and hydrochloric acid. The dichloride may also be used, but there is usually a considerable amount of carbon formation. Sulphur dioxide is reduced to hydrogen sulphide and water, and its reaction is both chemical and physical. Some carbon appears but in reduced quantities.

Referring now to the use of mixtures of materials in the cracking process, it will be observed that the effect upon productivity, efficiency and amount of styrol in the steam distillate is considerably magnified. When such properly constituted dehydrogenating mixtures are used, a considerable amount of gas is liberated, whereby the partial pressure on the ethyl benzol is reduced, and at the same time chemical reactions occur whereby the products of the cracking are combined to form materials which do not reduce the yield of styrol, but on the contrary increase it considerably. A mixture of sulphur, carbon disulphide and carbon tetrachloride is especially effective. Instead of carbon tetrachloride, ethylene chloride may be substituted in the mixture with almost equally beneficial results. Carbon disulphide and sulphur alone may be used with advantage, but for the sake of rendering the materials less likely to fire risk, it seems preferable to include carbon tetrachloride in dehydrogenating mixtures containing carbon disulphide. The use of 6 parts of acetone and 2.2 parts of sulphur on 100 parts of ethyl benzol is about as effective as a mixture of carbon disulphide and carbon tetrachloride, this being particularly useful where iron equipment is to be employed, since the presence of large quantities of carbon tetrachloride with the subsequent formation of hydrochloric acid may have a deleterious effect upon iron equipment. This of course would not be true in cases where chlorine-resisting metals were employed.

It may thus be seen that a wide range of materials may be employed as dehydrogenating mixtures and that by judicious selection, almost any manufacturing equipment may be used without deterioration resulting from any side reactions between the components of the dehydrogenating mixture and the furnace. It is also apparent that the manufacture of styrol by the pyrogenic decomposition of ethyl benzol at elevated temperatures can be greatly facilitated by the use of materials which preferably exert both a chemical and a physical effect upon the course of the reaction, the chemical effect being to combine with certain of the reaction by-products, and the physical effect that of reducing the partial pressure on the ethyl benzol. Furthermore the reaction can be favorably influenced by materials which exert only a chemical effect, wherein reaction by-products are combined or otherwise altered so that they do not interfere with the yield of styrol. Reference to the above table shows that the chemical effect alone is considerably greater than the purely physical effect caused by the use of the inert gases. It also shows that the combined chemical and physical effect is considerably greater than by the use of inert gases alone.

While the invention has been illustrated with ethyl benzol as the raw material, it is understood that the process of the invention may be applied to similar hydrocarbons for the formation of homologues of styrol or other such products, and in its broad aspect the invention comprehends the use of such other equivalent or similar raw materials.

Having thus described our invention, what we claim and desire to protect by Letters Patent is:

1. Method of producing a styrol from alkyl benzol which comprises pyrogenically dehydrogenating alkyl benzol in the presence of a dehydrogenating material containing sulphur, whereby the released hydrogen combines at least in part with the sulphur, and separating the styrol from the reaction by-products.

2. Method of producing styrol from ethyl benzol which comprises pyrogenically dehydrogenating ethyl benzol in the presence of a dehydrogenating mixture containing a sulphur compound capable of reacting with the released hydrogen, and separating the styrol from the reaction products.

3. Method of producing styrol from ethyl benzol which comprises pyrogenically dehydrogenating ethyl benzol in the presence of a dehydrogenating mixture comprising acetone and sulphur, and separating the styrol from the reaction products.

4. Method of producing styrol which comprises heating alkyl benzol to thereby split it into styrol and hydrogen, continuously reacting upon the hydrogen with a material comprising sulphur, lowering the partial pressure of the alkyl benzol by the presence of a gaseous agent substantially inert to the styrol, and separating styrol from the products.

5. Method of producing styrol from ethyl benzol which comprises pyrogenically dehydrogenating ethyl benzol in the presence of a mixture comprising two to three parts sulphur and a volatile organic compound substantially inert to styrol under the reaction conditions, and separating styrol from the reaction products.

WILLIS A. GIBBONS.
OMAR H. SMITH.